US012362499B1

(12) United States Patent
Sikina et al.

(10) Patent No.: US 12,362,499 B1
(45) Date of Patent: Jul. 15, 2025

(54) POLARIZATION VERSATILE RADIATOR

(71) Applicant: Raytheon Company, Waltham, MA (US)

(72) Inventors: Thomas V. Sikina, Acton, MA (US); Jack J. Schuss, Newton, MA (US); Izabella Furman, Natick, MA (US); Robert S. Isom, Allen, TX (US)

(73) Assignee: Raytheon Company, Waltham, MA (US)

( * ) Notice: Subject to any disclaimer, the term of this patent is extended or adjusted under 35 U.S.C. 154(b) by 2670 days.

(21) Appl. No.: 14/999,923

(22) Filed: Dec. 16, 2016

(51) Int. Cl.
*H01Q 21/00* (2006.01)
*H01Q 9/04* (2006.01)
*H01Q 21/06* (2006.01)
*H01Q 21/24* (2006.01)

(52) U.S. Cl.
CPC ............... *H01Q 21/00* (2013.01); *H01Q 9/04* (2013.01); *H01Q 21/06* (2013.01); *H01Q 21/24* (2013.01)

(58) Field of Classification Search
CPC ............... H01Q 21/00; H01Q 21/0006; H01Q 21/0031; H01Q 21/0043; H01Q 21/005; H01Q 21/06; H01Q 21/031; H01Q 21/064; H01Q 21/24; H01Q 21/245; H01Q 9/04
See application file for complete search history.

(56) References Cited

U.S. PATENT DOCUMENTS 5,268,701 A * 12/1993 Smith .................... H01Q 21/24 343/770
5,786,792 A * 7/1998 Bellus ................ H01Q 21/0087 343/770
6,005,531 A * 12/1999 Cassen ............... H01Q 21/0025 343/754
6,507,320 B2 1/2003 Von Stein et al.
6,608,535 B2 8/2003 Sherman et al.
6,624,787 B2 9/2003 Puzella et al.
7,671,696 B1 3/2010 Puzella et al.
8,279,131 B2 10/2012 Puzella et al.
(Continued)

FOREIGN PATENT DOCUMENTS

JP 11068448 A 3/1999
JP 2000261235 9/2000
JP 2006279474 10/2006

OTHER PUBLICATIONS

Communication Pursuant to Rules 161(1) and 162 EPC for European Application No. 17826059.2 dated Jul. 23, 2019; 3 Pages.
(Continued)

*Primary Examiner* — Peter M Bythrow
(74) *Attorney, Agent, or Firm* — DALY, CROWLEY, MOFFORD & DURKEE LLP

(57) ABSTRACT

A unit cell of an array antenna includes an integrated dilation and feed circuit and an associated radiator assembly. The integrated dilation and feed circuit includes an asymmetric dilation layer, an asymmetric combiner layer, a symmetric feed layer and a symmetric slot layer. Feed circuits on the feed layer are configured to couple radio frequency (RF) signals to/from a pair of orthogonally disposed slot elements symmetrically disposed on the slot layer of the integrated dilation-feed circuit. The slot layer couples signals to and from the radiator assembly. Such unit cell may be used to provide an array antenna including an active electronically scanned array (AESA) antenna.

24 Claims, 7 Drawing Sheets

(56) References Cited

U.S. PATENT DOCUMENTS

| | | | | |
|---|---|---|---|---|
| 8,350,773 | B1 * | 1/2013 | Kindt | H01Q 21/068 343/770 |
| 8,736,505 | B2 * | 5/2014 | Lambert | H01Q 13/085 343/768 |
| 8,814,601 | B1 * | 8/2014 | Sherrer | H01R 24/50 29/852 |
| 9,225,070 | B1 | 12/2015 | Zeweri et al. | |
| 2003/0067410 | A1 | 4/2003 | Puzella et al. | |
| 2006/0038732 | A1 * | 2/2006 | DeLuca | H01Q 21/064 343/754 |
| 2011/0102101 | A1 | 5/2011 | Brown | |
| 2016/0079672 | A1 * | 3/2016 | Cerreno | H01Q 21/065 343/848 |
| 2017/0162950 | A1 * | 6/2017 | Little | H01Q 1/50 |
| 2017/0271782 | A1 * | 9/2017 | Nipper | H01Q 21/24 |

OTHER PUBLICATIONS

Response filed on Jan. 31, 2020 for European Application No. 17826059.2; 21 Pages.

Notice of Allowance dated Nov. 12, 2021 for European Application No. 17826059.2; 7 Pages.

Response filed on Jun. 22, 2022 for European Application No. 17826059.2; 16 Pages.

Office Action dated Oct. 6, 2020 for Japanese Application No. 2019-531935 with English Translation; 30 Pages.

Response filed on Jan. 6, 2021 for Japanese Application No. 2019-531935 with Machine English translation; 18 pages.

Office Action dated Feb. 2, 2021 for Japanese Application No. 2019-531935 with English Translation; 11 Pages.

Response filed on Apr. 28, 2021 for Japanese Application No. 2019-531935 with Machine English translation; 13 Pages.

Notice of Allowance dated Apr. 30, 2021 for Japanese Application No. 2019-531935 with Machine English translation and allowed claims; 10 Pages.

PCT Search Report of the ISA for PCT Appl. No. PCT/US2017/066359 dated Mar. 29, 2018; 5 pages.

PCT Written Opinion of the ISA for PCT Appl. No. PCT/US2017/066359 dated Mar. 29, 2018; 10 pages.

* cited by examiner

POLARIZATION VERSATILE RADIATOR

BACKGROUND

As is known in the art, it may be advantageous for radio frequency (RF) systems (e.g. radar or communication systems) to transmit and receive RF signals having multiple different polarizations. Toward that end, some RF systems include antennas having radiator elements which are responsive to RF signals having two orthogonal polarizations (so-called dual-polarized radiators).

As is also known, such dual-polarized radiators may be used to provide active electronically scanned array (AESA) antennas for use in RF systems. Such AESA antennas find use in a wide range of military and non-military applications including water based (e.g. naval), air-based and land-based applications. A cross-polarization isolation characteristic of an RF system refers to the ability of the system to simultaneously receive an RF signal having a first polarization on a first signal channel while isolating an RF signal having a second, orthogonal polarization from the signal channel. The greater the cross-polarization isolation characteristic, the greater the effectiveness with which the RF system can operate.

SUMMARY

In accordance with the concepts, systems and circuits described herein, it has been recognized that in order to satisfy performance characteristics (e.g. polarization isolation characteristics) required in certain applications, a very high degree of symmetry and electrical isolation is required in the design of feed circuits and antenna elements included in a polarization diverse array which may be included, for example, in an active electronically scanned array (AESA) antenna.

In accordance with one aspect of the concepts, systems and circuits described herein, a unit cell of an array antenna comprises an integrated dilation and feed circuit and an associated radiator assembly. The integrated dilation and feed circuit includes a dilation layer having first and second transmission lines. One end of each dilation layer transmission lines is configured to be coupled to a transceiver and the other end of each dilation layer transmission line is coupled to an antenna element of a radiator assembly through combiner, feed and slot layers of the integrated dilation and feed circuit. The combiner layer includes a pair of reactive combiner circuits. The combiner circuit has asymmetric physical features—and a plurality of via holes are provided in the combiner layer between signal paths of the combiner circuit. The via holes suppress undesirable electromagnetic fields generated as a result of the asymmetry in the combiner circuit configuration. A first port of each reactive combiner circuit is coupled to a respective one of the dilation circuits. Second and third ports of each reactive combiner circuit are coupled to a first port of respective ones of four feed circuits symmetrically disposed on a feed layer: The feed circuits are configured to couple RF signals to/from a pair of orthogonally disposed slot aperture coupling elements (e.g. slot aperture couplers) symmetrically disposed on the slot layer of the integrated dilation-feed circuit. The slot layer couples signals to and from the radiator assembly.

With this particular arrangement, an integrated dilation-feed circuit having physical symmetry in feed and slot layers and which may be used in a unit cell of a polarization diverse antenna element is provided. In one embodiment, the radiator assembly includes a symmetric dual-polarized antenna element. Such a symmetric dual-polarized antenna element may be coupled to the symmetric, integrated dilation-feed circuit. The physical symmetry of the integrated dilation-feed circuit and the dual-polarized antenna element results in a dual-polarized antenna element unit cell having both physical and electromagnetic field symmetry. Furthermore, by providing both the integrated dilation-feed circuit and antenna element from asymmetric, circuit elements, the integrated dilation-feed circuit and antenna element are responsive to RF signals having any polarization (i.e. a polarization diverse antenna element and integrated dilation and feed circuit is provided) by nature of the vector combination of the two described orthogonal polarizations.

The integrated dilation-feed circuit and associated radiator assembly together form a polarization diverse antenna unit cell and a plurality of such polarization diverse unit cells may be disposed to provide a polarization diverse array antenna. The symmetry in both the integrated dilation-feed circuit and antenna element allows a high degree of polarization isolation to be achieved in a polarization diverse array antenna. Such a polarization diverse array antenna may be provided as part of a radar system. In one embodiment, the polarization diverse array antenna may be provided as a polarization diverse AESA antenna.

Furthermore, combining dilation and feed layers into a single RF printed circuit board results in a circuit having a relatively small amount of ohmic front-end loss as compared with prior art techniques.

Further still, the symmetric integrated dilation-feed circuit aligns an antenna element lattice structure (and thus the unit cell lattice) with a lattice structure of a transmit/receive integrated microwave module (TRIMM). This results in matched unit cell insertion phase (i.e. the radiator feed circuit connection points and TRIMM connection points are aligned thereby facilitating electrical connections between the antenna unit cells and the TRIMM which also results in each unit cell having a matched insertion phase for dual orthogonal polarizations and at all unit cells.

In another aspect of the concepts, systems and technologies described herein, a polarization diverse radar system comprises a polarization diverse AESA antenna provided from a plurality of unit cells with each of the unit cells comprising a polarization diverse antenna element.

In one embodiment, the radar system is responsive to RF signals having orthogonal circular polarizations as well as signals having orthogonal linear polarizations. In one embodiment the polarization diverse antenna is simultaneously responsive to RF signals having orthogonal circular and orthogonal linear polarizations. In another, the polarization diverse antenna is simultaneously responsive to RF signals having arbitrary polarization.

In some embodiments, the radar system may be coupled to an RF transceiver and both the polarization diverse antenna and RF transceiver are simultaneously responsive to RF signals having orthogonal circular and orthogonal linear polarizations.

It should be appreciated that the circuits, systems and techniques described herein may include one or more of the following features independently or in combination with another feature and that elements of different embodiments described herein may be combined to form other embodiments which may not be specifically set forth herein.

BRIEF DESCRIPTION OF THE DRAWINGS

The foregoing features may be more fully understood from the following description of the drawings in which.

DETAILED DESCRIPTION

Figure 1:
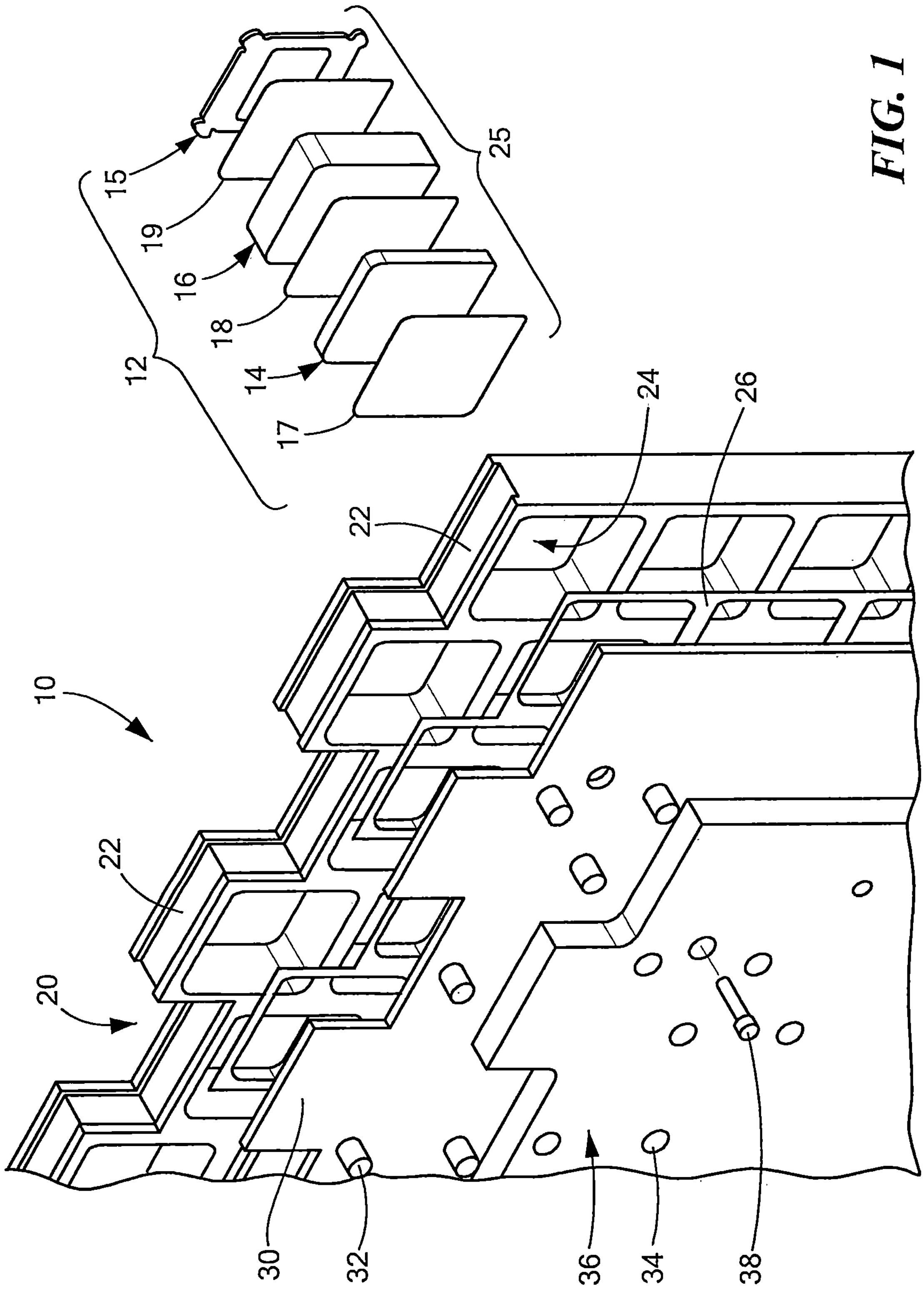
FIG. 1 is an exploded isometric view of a portion of a polarization diverse array antenna.

Described herein are concepts, systems, circuits and related techniques directed toward a polarization diverse antenna element (or radiator) and toward array antennas provided from such polarization diverse radiators.

Before describing the various embodiments of a polarization diverse radiator, it should be noted that reference is sometimes made herein to an array antenna (e.g. a polarization diverse array antenna) having a particular array shape and/or size (e.g., a particular number of antenna elements) or to an array antenna comprised of a particular number of antenna elements. One of ordinary skill in the art will appreciate, however, that the concepts, circuits and techniques described herein are applicable to various sizes, shapes and types of array antennas.

Similarly, reference is sometimes made herein to a grouping of antenna elements into so-called antenna "panels" having a particular geometric shape (e.g. square, rectangular, round) and/or size (e.g., a particular number of antenna elements). Such panels may be coupled to form other, larger antennas. One of ordinary skill in the art will appreciate that the techniques described herein are applicable to various sizes and shapes of array antennas as well as to various sizes and shapes of panels.

Thus, although the description provided herein below describes the concepts, systems and circuits sought to be protected in the context of a polarization diverse array antenna having a substantially square or rectangular shape and comprised of a plurality of panels, each having a substantially square or rectangular-shape, those of ordinary skill in the art will appreciate that the concepts equally apply to other sizes and shapes of array antennas and panels and antenna elements having a variety of different sizes, shapes.

Reference is also sometimes made herein to an array antenna including an antenna element of a particular type, size and/or shape. For example, one type of radiating element is a so-called patch antenna element having a square shape and a size compatible with operation at a particular frequency (e.g. 10 GHz) or range of frequencies (e.g. the X-band frequency range). Reference is also sometimes made herein to a so-called "stacked-patch" antenna element. Those of ordinary skill in the art will recognize, of course, that other shapes and types of antenna elements (e.g. an antenna element other than a stacked-patch antenna element) may also be used and that the size of one or more antenna elements may be selected for operation at any frequency in the RF frequency range (e.g. any frequency in the range of about 1 GHz to about 100 GHz). The types of radiating elements which may be used in the antenna described herein include, but are not limited to, slot elements, notch elements, dipoles or any other antenna element (regardless of whether the element is a printed circuit element) known to those of ordinary skill in the art. Thus, those of ordinary skill in the art will appreciate that the concepts described herein equally apply to other types of antenna elements.

It should also be appreciated that the antenna elements or panels can be provided having any one of a plurality of different antenna element lattice arrangements including periodic lattice arrangements (or configurations) such as rectangular, circular square, triangular (e.g. equilateral or isosceles triangular), and spiral configurations as well as non-periodic or other geometric arrangements including arbitrarily shaped lattice arrangements.

Applications of at least some embodiments of the concepts, systems, circuits and techniques described herein include, but are not limited to, military and non-military (i.e. commercial) applications including, but not limited to radar, electronic warfare (EW) and communication systems for a wide variety of applications including ship-based, airborne (e.g. plane, missile or unmanned aerial vehicle (UAV)), and space and satellite applications. It should thus be appreciated that the circuits described herein can be used as part of a radar system or a communications system.

The circuits to be described herein below can also utilize embedded circulators; a slot-coupled, polarized egg-crate radiator; a single integrated monolithic microwave integrated circuit (MMIC); and a passive radio frequency (RF) circuit architecture. For example, as described further herein, technology described in the following commonly assigned United States patents can be used in whole or in part and/or adapted to be used with at least some embodiments of the circuits and systems described herein: U.S. Pat. No. 6,611,180, entitled "Embedded Planar Circulator"; U.S. Pat. No. 6,624,787, entitled "Slot Coupled, Polarized, Egg-Crate Radiator"; and/or U.S. Pat. No. 6,731,189, entitled "Multilayer stripline radio frequency circuits and interconnection methods." Each of the above patents is hereby incorporated herein by reference in their entireties.

Referring now to FIG. 1, a portion of a polarization diverse array antenna 10 (or more simply an array 10) comprises a plurality of polarization diverse radiators with a single polarization diverse radiator 12 being shown. Radiator 12 is comprised of a patch antenna, here a stacked-patch antenna comprising inner and outer conductors 14, 15 spaced apart by a foam spacer 16 and dielectric substrates 17, 18, 19.

A conductive frame 20 includes walls 22 which define a plurality of apertures or cavities 24 and this frame 20 is sometime referred to as an "egg-crate frame, or metal frame" or more simply an "egg-crate." Each of the plurality of radiators 12 in array 10 are disposed in a respective one of the cavities 24 provided in conductive frame 20. The radiator 12 and frame/cavity 20/24 together form a radiator subassembly 25. A substrate 26 having openings provided therein to match the lattice pattern of frame 20 is disposed between a surface of frame 20 and a surface of an integrated dilation and feed circuit 30. In preferred embodiments, substrate 26 maybe provided as a thermal substrate, used to conduct heat between the feed subassembly and the metal frame.

As will become apparent from the description provided herein below, integrated dilation and feed circuit 30 may be provided as a multilayer printed circuit board (PCB). Radio frequency (RF) connectors 32 are coupled to dilation and feed circuit 30 and provide a means for RF signals to be coupled to/from the radiator assemblies 25 through integrated dilation and feed circuit 30. The RF connectors 32 are disposed through openings 34 in a support plate 36. Support plate 36 is disposed over a surface of dilation and feed circuit 30 opposite frame 20 to provide mechanical support to antenna 10, as well as a thermal source or sink, depending on the operating conditions. One or more alignment structures 38 (here illustrated as an alignment pin 38) are disposed through appropriate ones of openings in both the support plate and the integrated dilation and feed circuit 30 to aid in alignment of at least the two structures 36, 30.

As will be described in detail further below in conjunction with FIGS. 2-3, each radiator assembly 25 is coupled to a particular set of dilation and feed circuitry included in integrated dilation and feed circuit 30. The combination of integrated dilation and feed circuit and associated radiator assembly forms a unit cell. Thus, array 10 is provided from a plurality of individual polarization diverse unit cells.

The unit cell architecture provided by the combination of radiators 12 and dilation and feed circuit 30 results in an antenna having matched unit cell insertion phases and also having physical symmetry as well as symmetric field symmetry (i.e. electromagnetic field symmetry). Having such symmetry also results in an array antenna capable of achieving a high degree of polarization isolation which is important in an antenna responsive to multiple different polarizations (i.e. a polarization diverse system).

The combination of the radiator assembly symmetry and integrated dilation and feed circuit symmetry also results in a radiator assembly having low total and ohmic front-end loss. The low ohmic loss is the result of at least: minimizing the path length between the RF connector interface and the slot aperture couplers; packaging the dilation and feed networks with the maximum density while avoiding higher-order mode interaction; reducing (and ideally, minimizing) impedance mismatch at all components and their interfaces; the use of reactive, rather than resistive, combiners; and utilizing best practices in the form of the associated transmission lines e.g., conductor surface roughness, reduced (and ideally, minimum) line width allowances, and avoiding reactive field coupling.

Figure 2:
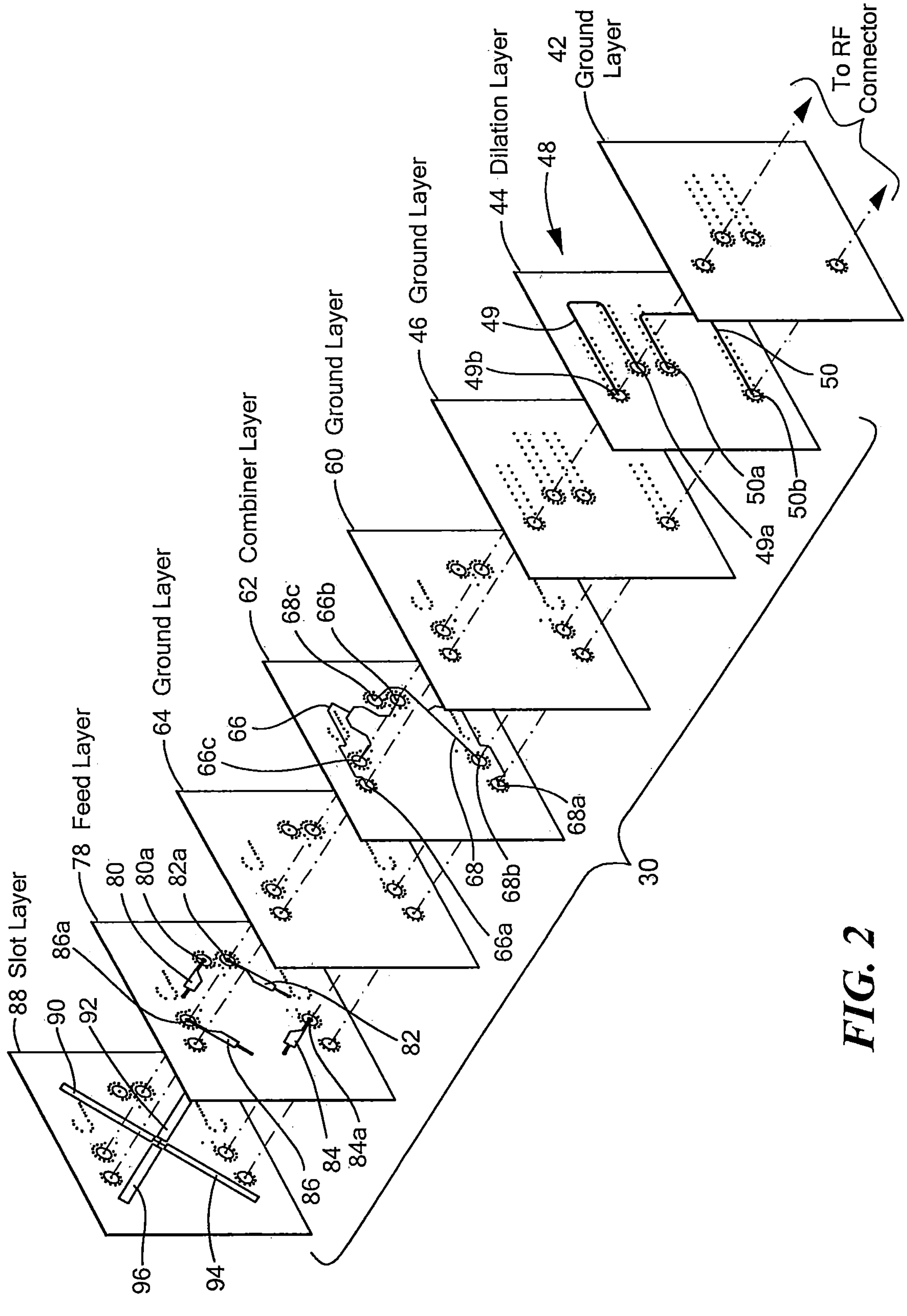
FIG. 2 is an exploded isometric view showing conductive layers of an integrated dilation and feed circuit.
Figure 2A:
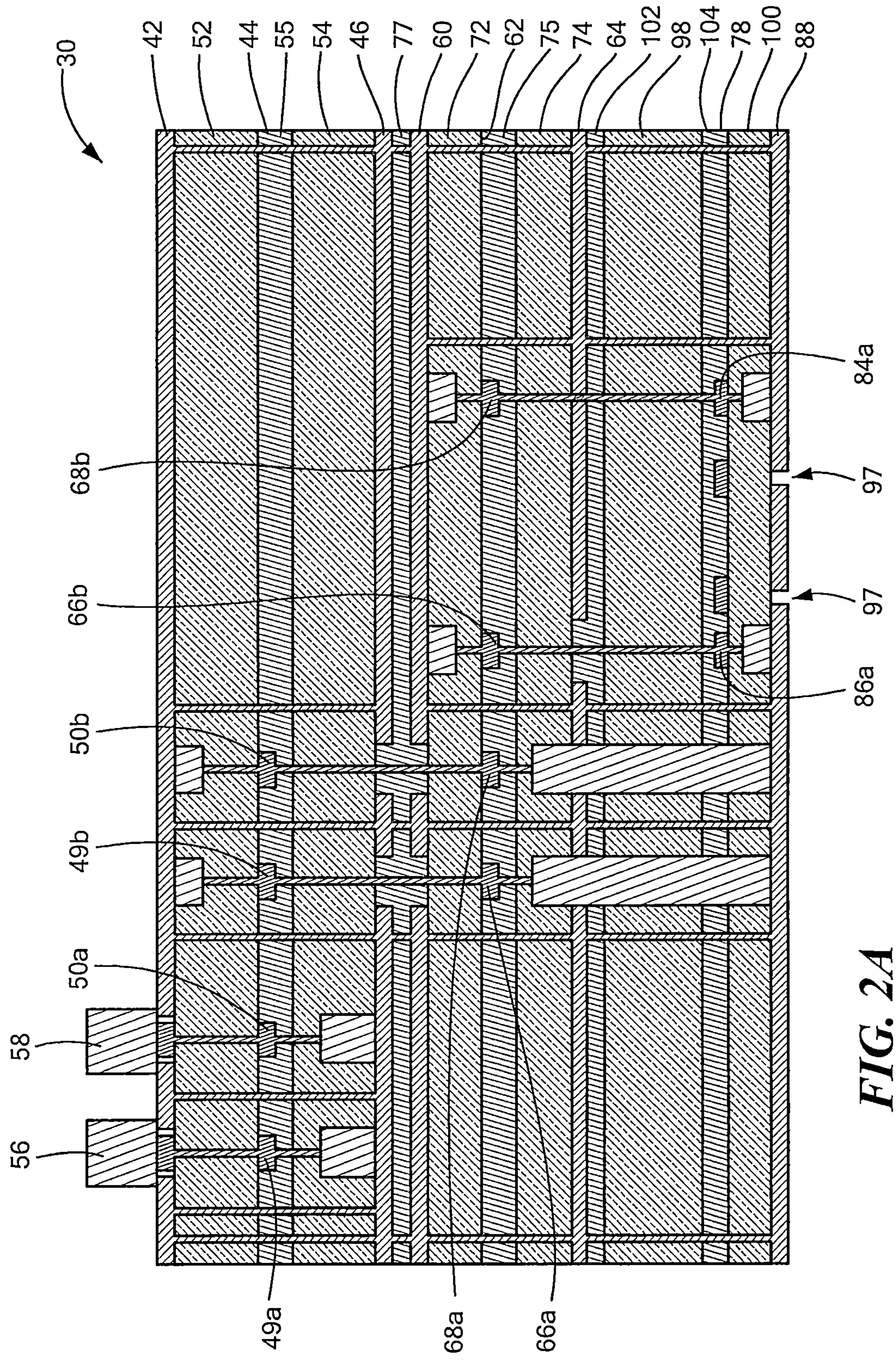
FIG. 2A is an enlarged cross-sectional view of an integrated dilation and feed circuit which may be the same as or similar to the integrated dilation and feed circuit of FIG. 2.
Figure 2B:
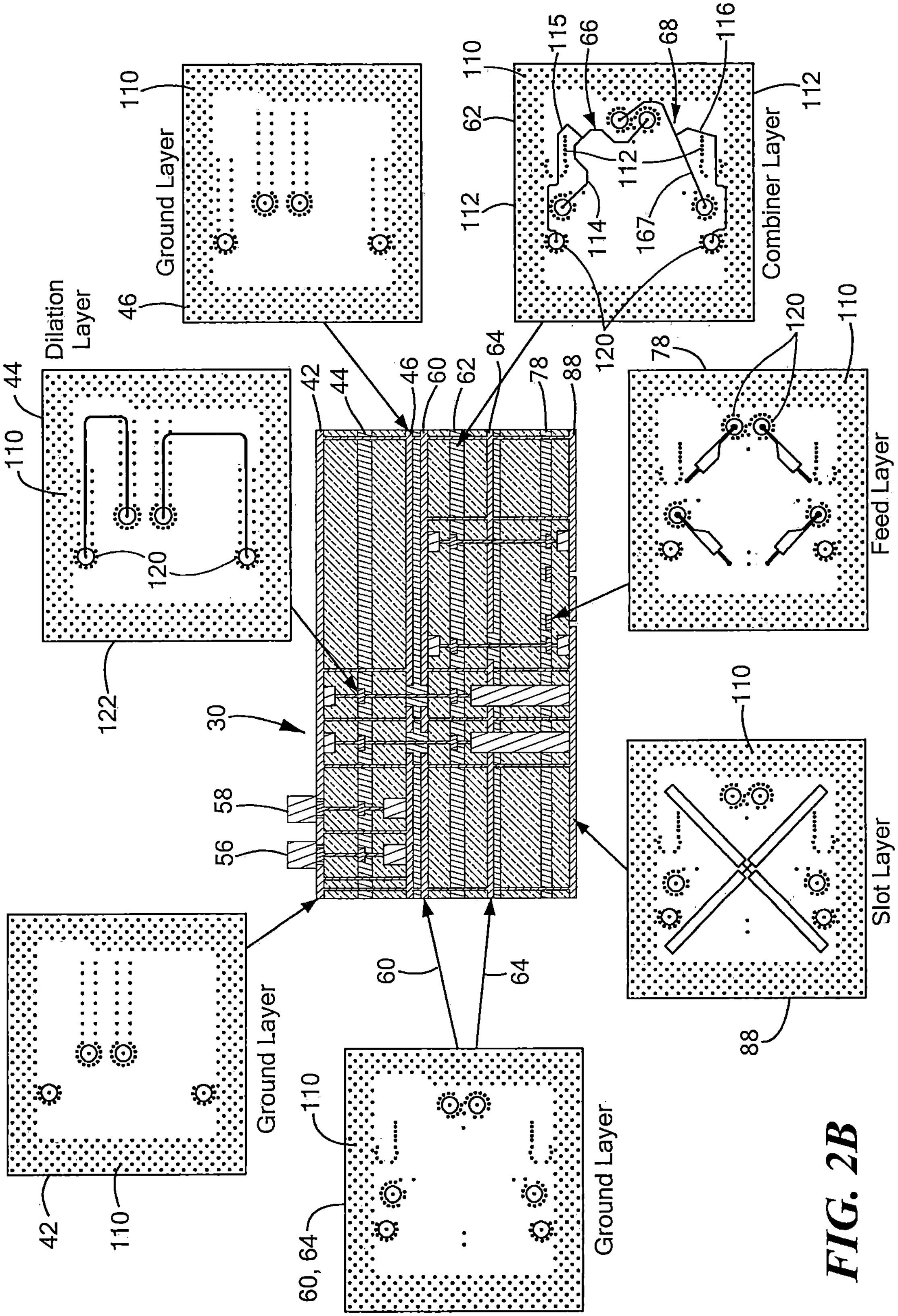
FIG. 2B is a cross-sectional view of an integrated dilation and feed circuit accompanied by top views of the conductive layers of FIG. 1.

Referring now to FIGS. 2-2B in which like elements of FIG. 1 are provided having like reference numerals, the integrated dilation and feed circuit layer 30 includes a dilation circuit layer 44 disposed between a pair of ground plane layers 42, 46 (or more simply ground planes 42, 46). Dilation circuit layer 44 includes a dilation circuit 48 comprised of dilation circuit signal paths 49, 50. The purpose of the dilation circuits is to provide equal electrical path insertion phase for each of the two polarization and all unit cells within the array. It is noteworthy to consider that the dilation path provided differs for the various unit cells because of panel edge conditions and other unit cell differentiations. It should be appreciated that, for clarity, in FIG. 2 the inner patch element and substrate, outer patch element and substrate, cavity and integrated radome are not shown.

As may be most clearly seen in FIG. 2A, a pair of dielectric substrates 52, 54 are disposed between ground planes 42, 46 and dilation circuit signal paths 49, 50 are disposed on at least one of the substrates (preferably, for at least ease of manufacturing, on the same surface of the same substrate). In this illustrative embodiment, dilation circuit signal paths 49, 50 are disposed on a surface of substrate 52. Substrates 52, 54 are bonded or otherwise secured together. In one embodiment, substrates 52, 54 are bonded via a bond film 55 (e.g. a thermoset based thin film) as is generally known. Thus, in this illustrative embodiment, layers 42, 44, 46 and substrates 52, 54 provide dilation circuit as a stripline printed circuit board circuit.

Respective ones of RF connectors 56, 58 (FIG. 2A) are coupled to first ends 49*a*, 50*a* of dilation circuit signal paths 49, 50. Second ends 49*a*, 50*a* of signal paths 49, 50 are connected through an electrical signal path which passes through ground planes 46, 60 to a combiner circuit layer 62 disposed between a pair of ground plane layers 60, 64 (or more simply ground planes 60, 64). Combiner circuit layer 62 includes a pair of reactive combiner circuits 66, 68. In particular, second ends 49*b*, 50*b*, of signal paths 49, 50 are coupled to first ports 66*a*, 68*a* of combiner circuits 66, 68. It should be appreciated that electrical connections between layers may be using conductive via holes (or more simply "conductive vias") as is generally known. Other techniques for making layer-to-layer electrical conditions may also be used. In embodiments, interconnections 49*a*, 50*a*, 49*b*, 50*b* may all use a central conductive via with a surrounding ground via cage, forming a coaxial Transverse ElectroMagnetic (TEM) interface.

As may be most clearly seen in FIG. 2A, a pair of dielectric substrates 72, 74 are disposed between ground planes 60, 64 and combiner circuits 66, 68 are disposed on at least one of the substrates (preferably, for ease of manufacturing, on the same surface of the same substrate, and for the purpose of creating a stripline transmission line). In this illustrative embodiment, combiner circuits 66, 68 are disposed on a surface of substrate 72. Substrates 72, 74 are bonded or otherwise secured together. In one embodiment, substrates 72, 74 are bonded via a bond film 75 (e.g. a thermoset based thin film) as is generally known. Thus, in this illustrative embodiment, layers 60, 62, 64 and substrates 72, 74 provide the combiner circuit as a stripline PCB which is bonded or otherwise secured to the dilation PCB. In one embodiment, the dilation and combiner PCBs are bonded via a bond film 77 (e.g. a thermoset based thin film) as is generally known.

Second and third ports 66*b*, 68*b*, 66*c*, 68*c* of combiner circuits 66, 68 are connected through a TEM electrical signal path which passes through ground plane 64 to respective ones of feed circuits 80-86 on a feed circuit layer 78. In particular, second and third ports 66*b*, 68*b*, 66*c*, 68*c* of combiner circuits 66, 68 are coupled to respective ones of feed circuit ports 80*a*-86*a*. In this illustrative embodiment, combiner circuits 66, 68 are provided as reactive combiner circuits. These circuits use physical and electrical symmetry, having a significant impact on the polarization performance, and introduce transmission line impedance matching details in the form of the various stripline conductor widths, as shown.

Feed circuit layer is disposed over a slot layer 88 having slots 90-96 provided therein. In this illustrate example, slot layer 88 is provided as a conductor and slots 90-96 may be formed, by etching away portions of the conductor 88. It should, of course, be appreciated, however, that any additive or subtractive process may be used to form slots (e.g. in the event that slot layer is provided as a dielectric). Feed circuits 80-86 are symmetrically disposed on feed layer 78 such that each feed circuit 80-86 crosses a respective one of the slots 90-96, generally denoted 97, which are symmetrically disposed on a slot layer 88. In this illustrative embodiment, the feed layer 78 comprises four feed circuits 80-86. In other embodiments, fewer or more than four feed circuits may be used, and may cause degraded polarization performance. The feed circuits are disposed on a substrate and arranged such that when a first surface of the slot layer is disposed over a first surface of the feed layer, the feed circuits intercept (here, orthogonally cross) the slot apertures. This arrangement enables RF energy to be coupled between the slots in the slot layer and the feed circuits on the feed layer. These circuits use physical and electrical symmetry in the form of the four feed points used, having a significant impact on the polarization performance, and introduce central ground conductors to force electrical symmetry.

As noted above, the RF ports of each feed circuit are coupled to the second and third ports of reactive combiner/divider circuits provided on a combiner layer. The output ports of the combiner circuits are connected via an electrical signal path which passes through a ground layer and to first ends of signal paths on the dilation layer. The second ends of the signal paths are configured to be coupled to RF connectors.

In a transmit mode of operation, the feed circuits excite the slots by means of aperture coupling. In a receive mode of operation, the feed circuits couple RF energy from the slots. The slots couple RF energy to/from (depending upon whether the system is operating in a transmit or receive mode) the radiating elements which are here provided as square patch antenna elements 14, 15 (FIG. 1).

As may be most clearly seen in FIG. 2A, a dielectric substrate 98 is disposed between ground plane 64 and feed circuits 80-86. A dielectric substrate 100 is also disposed between ground plane 64 and feed circuits 80-86 on feed layer 78. Feed circuits 80-86 are disposed on at least one surface of substrates 98, 100 (preferably, for ease of manufacturing, on the same surface of the same substrate). In this illustrative embodiment, feed circuits 80-86 are disposed on a surface of substrate 100. The feed layer 78 is configured as an asymmetric stripline circuit in order to facilitate preferred, and ideally, optimal aperture coupling between it and the slot coupler 88.

Substrate 98 is bonded or otherwise secured to ground plane 64 and substrate 100 is bonded or otherwise secured to substrate 98. In one embodiment, the substrates 98, 100 are bonded via bond films 102, 104 (e.g. a thermoset based thin film) as is generally known. Thus, in this illustrative embodiment, layers 60, 62, 64 and substrates 72, 74 provide the combiner circuit as a stripline PCB circuit which is bonded or otherwise secured to the dilation PCB. In one embodiment, the dilation and combiner PCBs are bonded via a bond film 77 (e.g. a so-called "thermoset" based thin film) as is generally known.

The integrated dilation and feed circuit 30 is bi-directional meaning that RF signals may propagate in either direction through the circuit. For example, signals introduced to the circuit through slot layer 88 may appear at one or both of RF connectors 56, 58 (depending upon the polarization state and the polarization phase relationship and amplitudes of the RF signals provided to the slot layer and depending upon which ones of slots 90-96 receive the signal(s)). Similarly, signals introduced to the circuit through RF connectors 56, 58 may appear at one or all of slots 90-96 (depending upon the phase relationship and amplitudes of the RF signals provided to RF connectors 56, 58).

Operation of the integrated dilation and feed circuit 30 will next be explained assuming RF signals are introduced into the circuit through RF connectors 56, 58 (which may correspond, for example, to a transmit mode of a radar system in which the integrated dilation and feed circuit 30 is disposed). RF signals propagate through connectors 56, 58 into first ends (or ports) 49*a*, 50*a* of the dilation signal paths and propagate along signal paths 49, 50 to ports 49*b*, 50*b*. The signals then propagate from ports 49*b*, 50*b* to inputs 66*a*, 68*a* of reactive combiners 66, 68.

The reactive combiners divide the signals and the so-divided signals propagate from respective ones of combiner ports 66*b*, 66*c*, 68*b*, 68*c* to respective ones of feed circuit ports 80*a*, 82*a*, 84*a*, 86*a*. The feed circuits 80-86 are disposed such that each feed circuit substantially orthogonally intersects a respective one of the slots 90-96 and RF energy is coupled from respective ones the feed circuits 80-86 to respective ones of the slots 90-96.

It should be appreciated that, in order to promote clarity in the written description and drawings, certain circuit structures such as via holes and alignment structures which are desired or necessary for desirable circuit performance and manufacturing processes, have been omitted from the circuits shown in FIGS. 2-2A. Via holes structures are described in conjunction with FIG. 2B.

Referring now to FIG. 2B, as noted above, the integrated dilation and feed circuit includes a plurality of via holes. Via holes 110 are provided in the perimeter of each layer 42, 44, 46, 60, 62, 64 78 and 88. Via holes 110 reduce (and ideally prevent) the number and amplitude of RF signals (i.e. electromagnetic fields) from entering or leaving the unit cell (i.e. the vias 110 reduce, and ideally eliminate, leakage signals from propagating between the unit cells). The vias 110 are thus sometimes said to form an RF cage around each unit cell.

It should be appreciated that a plurality of via holes 120 (most clearly illustrated in FIG. 2C) substantially encircle each of the RF ports provided in layers 42, 44, 46, 60, 62, 64 78 and 88. Such vias produce and ideally minimize or even eliminate stray RF signals generated, for example, as a result of TEM transitions between ports.

It should be appreciated that dilation layer 44 is asymmetric and thus includes a large number of vias 122 to suppress any undesired electromagnetic fields (e.g. RF leakage signals) which may be generated as a result of the asymmetry. It should be appreciated that the vias 122 in dilation layer 44 do not penetrate to the combiner circuit layer, feed circuit layer or the slot layer, and are restricted to the dilation stripline circuit. Thus, the vias 122 are so-called "blind vias" since they do not extend to any visible layer of the integrated dilation and feed PCB.

The reactive combiner circuits 66, 68 on combiner layer 62 are also asymmetric. Thus, a plurality of conductive via holes 112 (or more simply vias 112) are provided in the combiner layer between signal path regions 114, 115 and 116, 117 of the combiner circuits 66, 68. The vias 112 disposed between at least some signal paths of the combiners reduce, and ideally minimize or even totally prevent, unintentional and undesired coupling of signals (e.g. electromagnetic fields) between signal paths which make up the combiner. Such undesirable fields may be generated, for example, as a result of the asymmetry in the combiner circuit configuration and/or fabrication or from proximity effects of densely packed layers, such as this one.

Figure 2C:
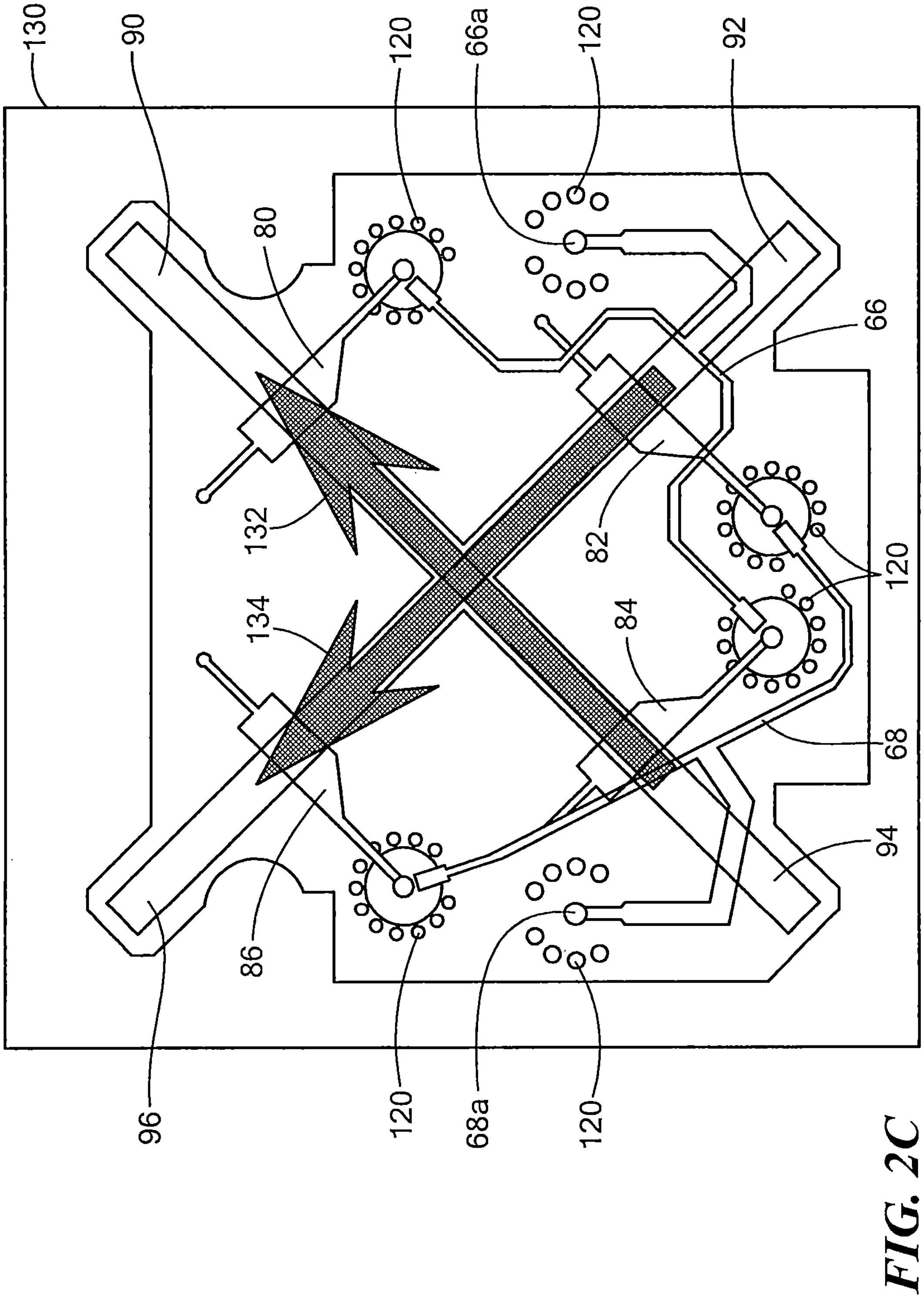
FIG. 2C is an overlay diagram of a polarization diverse antenna unit cell including the integrated dilation and feed circuit of FIG. 2.

Referring now to FIG. 2C, an overlay of the combiner, feed and slot layers 62, 78, 88 discussed in conjunction with FIGS. 2-2B superimposed over a patch antenna element 130 is shown. As illustrated in FIG. 2C, this arrangement can be used to generate a pair of orthogonal electric field vectors 132, 134, here shown at angles of ±45° with respect to patch element 130. Such orthogonal electric field vectors 132, 134 may be generated when an RF signal is provided to ports 56, 58 and subsequently to ports 66*a*, 68*a* of combiner circuits 66, 68. The 45° vector orientation also provides orthogonal horizontal and vertical linear polarization products resulting from the 0° or 180° phase relationship between the two excited vectors.

Given the integrated dilation and feed circuit 30 described in conjunction with FIGS. 1-2B, one of ordinary skill in the art will now readily understand how to generate or receive RF signals having any orthogonal circular polarization (e.g. RF signals having left or right circular polarizations, RHCP, LHCP) and/or any orthogonal linear polarization (e.g. RF signals having horizontal and vertical polarizations).

In radar usage, those two orthogonal sets of polarization (e.g. RHCP, LHCP, vertical and horizontal) are all that is needed to detect signals (e.g. radar return signals or communication signals) having any polarization (i.e. the radar has polarization diversity). The importance behind this is that it allows a radar or other RF system to receive a full amount of radiated power through the two orthogonal sets of polarizations. It is thus important to note that the diagonal polarization set of fields created via the circuits and technique described herein allows the system to produce RHCP, LHCP as well as horizontal and vertical polarizations with full radiated power, other than the orthogonal diagonal polarizations, these latter being considered unnecessary for radar operation.

Figure 3:
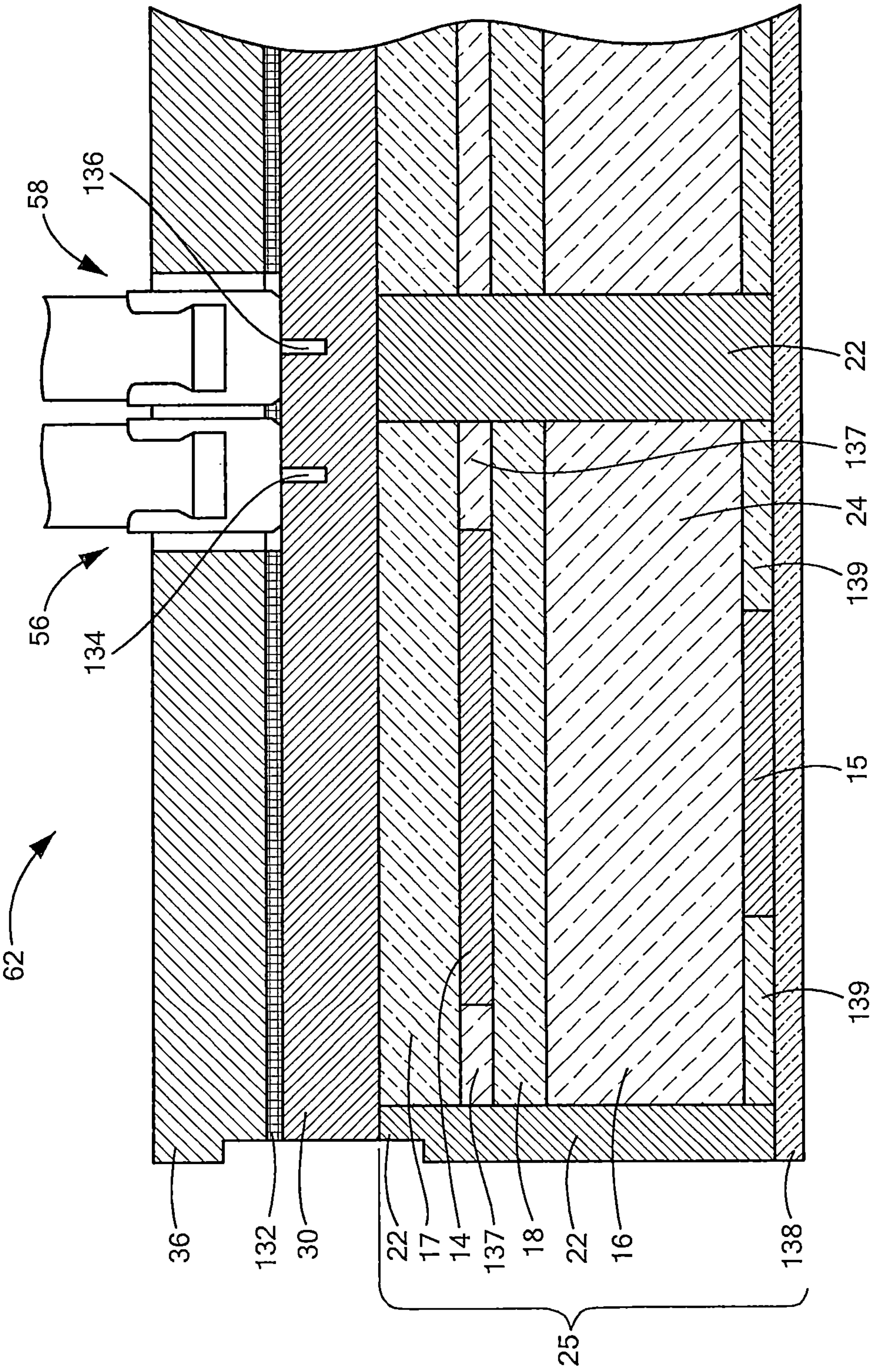
FIG. 3 is a cross-sectional view of a unit cell of a polarization diverse radiator.

Referring now to FIG. 3, in which like elements of FIGS. 1-2C are provided having like reference designations, a unit cell portion 62 of an array antenna 10' which may be the same as or similar to array antenna 10 describe above in conjunction with FIG. 1, includes support plate 36 having a pair of connectors 56, 58 disposed there through. A gap pad 132 is disposed between a surface of support plate 36 and a surface of integrated dilation and feed circuit 30. Gap pad 132 has a thickness and pliability characteristic sufficient to fill gaps between the surfaces of support plate 36 and a surface of integrated dilation and feed circuit 30 (e.g. gaps which may result due to manufacturing tolerances and/or limitations or due to other imperfections in the surfaces of support plate 36 and a surface of integrated dilation and feed circuit 30). Center conductors (or pins) 134, 136 of RF connectors 56, 58 extend into integrated dilation and feed circuit 30 and provide an RF connect to dilation signal path ports 49*a*, 50*a* (FIG. 2). The center conductors of the RF connectors extend through dilation and combiner layers 44, 62 but do not extend to feed circuit layer 78.

Integrated dilation and feed circuit 30 is disposed on a first surface of frame 20 and more particularly on surfaces of frame walls 22. Substrate 17 is disposed over a surface of dilation and feed circuit 30 and inner patch 14 is disposed over substrate 17. A substrate 18 is disposed over patch 14. Substrates 17, 18 are bonded or otherwise screwed together e.g. via bond film 137 (e.g. a thermostat based thing film) as is generally known. Foam spacer 16 is disposed between outer patch 15 and dielectric substrate 18. A radome 138 is disposed over outer patch 15. A bond film 139 secures the radome 138 to foam spacer 16 to thus provide radome 138 as an integrated radome.

In a transmit mode, RF energy is coupled through RF connectors 56, 58 and into dilation and feed circuit 30. The RF energy propagates through dilation and feed circuit 30 to slots (or apertures) 90-96 and into the radiator cavity 24 (FIG. 1) to the dual-polarized, stacked-patch antenna elements 14, 15.

In a receive mode, RF energy intercepted by the dual stacked-patch antenna elements 14, 15 is coupled into the cavity 24 defined by conductive walls 22 and subsequently through the apertures 90-96 in the slot layer 88 (FIG. 2) to feed circuitry, combiner circuitry and dilation circuitry through which the signals are coupled to RF connectors 56, 58. In a receive mode, RF signals having two orthogonal polarizations are provided at respective ones of the RF connectors 56, 58.

As noted above, the two patches 14, 15, as well as slot and feed layers 88, 78 are provided having as close to perfect physical symmetry as possible. Such symmetry provides the radiator assembly having a relatively high cross-polarization characteristic, given the electrical symmetry of the feed circuitry.

Figure 4:
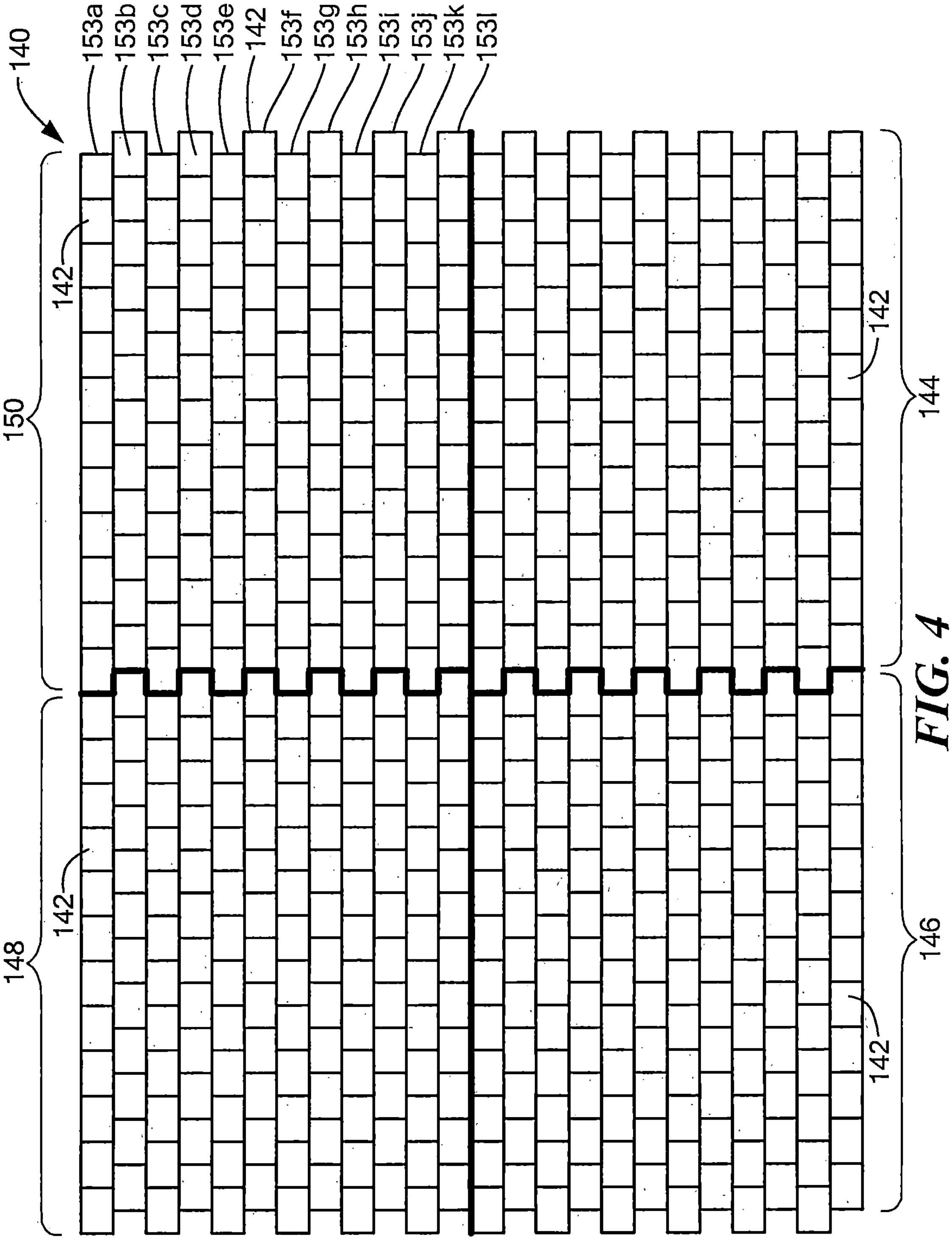
FIG. 4 is a layout diagram of an active electronically scanned array (AESA) provided from one or more polarization diverse radiators.

Referring now to FIG. 4, a polarization diverse active electronically scanned array (AESA) 140 is provided from a plurality of polarization diverse radiators, which maybe the same as or similar to the radiators described above in conjunction with FIGS. 1-3. In this illustrative embodiment, each "block" 142 shown in FIG. 4 represents a unit cell which may be the same as or similar to the unit cells described above in conjunction with FIGS. 1-3. Thus, the radiators and more particularly the unit cells 142 which make up AESA 140, are disposed in a triangular lattice configuration.

The polarization diverse radiators may be the same as or similar to the radiators described above in conjunction with FIGS. 1-3 and are responsive to RF signals having both orthogonal circular and orthogonal linear polarizations. In some embodiments, the AESA is sequentially responsive to RF signals having orthogonal circular and linear polarizations. In other embodiments, the AESA is simultaneously response to orthogonal circular and linearly polarized RF signals.

The AESA 140 is comprised of a plurality of panels, here four panels 142-148, each of which is provided from a plurality of polarization diverse elements included in unit cells 142. It should be appreciated that in this exemplary embodiment, the total number of unit cells 142 comprises the entire array antenna 140. In one embodiment, the total number of unit cells is sixteen. The particular number of unit cells used to provide a complete AESA antenna can be selected in accordance with a variety of factors including, but not limited to, the frequency of operation, array gain, the space available for the array antenna and the particular application for which array antenna 140 is intended to be used.

Those of ordinary skill in the art will also appreciate that unit cells 142 may be grouped into-sub-arrays. Those of ordinary skill will also appreciate how to select the number of unit cells included in each sub-array as well as the number of sub-arrays to include in each panel which comprise the complete AESA antenna.

In the illustrated embodiment each panel comprises twelve rows 153*a*-153*l* of antenna elements with each row containing twelve unit cells (and thus twelve radiator assemblies). Each of the panels is thus said to be a twelve by twelve (or 12×12) panel. Other panel sizes and configurations are also possible (e.g. eight by eight panels or rectangular or triangular shaped panels). Thus, in this illustrative embodiment, each panel comprises one hundred forty-four (144) unit cells. In the case where the array 10 is comprised of four (4) such panels 144-150, the array 140 comprises a total of five-hundred and seventy-six (576) unit cells.

In view of the above exemplary embodiments, it should thus be appreciated that each panel can include any desired number of elements. The particular number of elements to include in each of the panels can be selected in accordance with a variety of factors, including but not limited to, the desired frequency of operation, array gain, the space available for array antenna 140 and the particular application for which the array antenna 140 is intended to be used as well as the size of each panel. For any given application, those of ordinary skill in the art will appreciate how to select an appropriate number of radiating elements to include in each panel and/or in the array 140. The total number of unit cells 142 included in an antenna array such as antenna array 140 depends upon the number of panels included in the antenna array and the number of antenna elements included in each panel.

As is now apparent from the description herein above, each unit cell (and thus each panel) may be electrically autonomous (excepting of course any mutual coupling which occurs between elements within a panel and on different panels). Thus, the RE feed circuitry which couples RF energy to and from each radiator on a panel is incorporated entirely within the unit cell for that radiator (i.e. all of the RF feed circuitry which couples RF signals to and from an antenna element is contained within that element). As explained above, each unit cell includes one or more RF connectors and the RF signals are provided to/from the antenna element through the RF connector(s) provided on each unit cell.

Also, signal paths for logic signals and signal paths for power signals which couple signals to and from transmit/receive (T/R) circuits are contained within the panel in which the TRIMM modules exist.

An RF beam for the entire array 140 is formed by an internal or external beamformer (i.e. external to each of the unit cells or to their panel assembly) that combines the RF outputs from each of the unit cells. As is known to those of ordinary skill in the art, the beamformer may be conventionally implemented as a printed wiring board (e.g. a stripline circuit) that combines N elements into one RF signal port (and hence the beamformer may be referred to as a 1:N beamformer).

The elements are mechanically fastened or otherwise secured to a mounting structure (e.g. support plate 36 in FIG. 1) using conventional techniques such that the array lattice pattern is continuous across each panel which comprises the array antenna. In one embodiment, the mounting structure may be provided as a "picture frame" to which the elements are secured using fasteners. The tolerance between interlocking sections of the panels is selected based upon a variety of factors including but not limited to the frequency of operation and the affect of the tolerance on antenna performance. Thus, antennas operating in K-band frequency range may require tighter (i.e. smaller) tolerances than antennas operating in the S-band frequency range, for example. Preferably, the elements are mechanically mounted such that the array lattice pattern (which is shown as a triangular lattice pattern in exemplary embodiment of FIG. 4) appears electrically continuous across the entire surface (or "face") of the array 140.

It should be appreciated that various embodiments of the circuits, systems and techniques described herein may include one or more of the features and/or structures describe above in conjunction with FIGS. 1-4 and that the features and/or structures may be used independently or in combination with one or more other features and/or structures and that features and/or structures of different embodiments described herein may be combined to form other embodiments which may not be specifically set forth herein.

While particular embodiments of concepts, systems, circuits and techniques have been shown and described, it will be apparent to those of ordinary skill in the art that various changes and modifications in form and details may be made therein without departing from the spirit and scope of the concepts described herein. For example, some of the presented implementation examples refer to a system implemented using a stripline construction. It will be appreciated that the concepts described apply to systems implemented in whole or in part, using microstrip or co-planar waveguide transmission lines. Other combinations or modifications are also possible, all of which will be readily apparent to one of ordinary skill in the art after reading the disclosure provided herein.

Having described preferred embodiments which serve to illustrate various concepts, systems circuits and techniques, which are the subject of this patent, it will now become apparent to those of ordinary skill in the art that other embodiments incorporating these concepts, systems circuits and techniques may be used. For example, it should be noted that individual concepts, techniques, features and/or structures of different embodiments described herein may be combined to form other embodiments not specifically set forth above. Furthermore, various concepts, techniques, features and/or structures, which are described in the context of a single embodiment, may also be provided separately or in any suitable sub-combination. It is thus expected that other embodiments not specifically described herein are also within the scope of the following claims.

Accordingly, it is intended that the scope of the present claims include all other foreseeable equivalents to the features and structures as described herein and with reference to the drawing figures. Accordingly, the subject matter sought to be protected herein is to be limited only by the scope of the claims and their equivalents.

It is felt, therefore that the concepts, systems, circuits and techniques described herein should not be limited by the above description, but only as defined by the spirit and scope of the following claims which encompass, within their scope, all such changes and modifications.

All publications and references cited herein are expressly incorporated herein by reference in their entirety.

What is claimed is:

1. An integrated dilation and feed circuit comprising:

an asymmetric a dilation layer comprising a pair of dilation circuit signal paths;

an asymmetric reactive combiner layer comprising a pair of reactive combiner circuits, said asymmetric reactive combiner circuit layer disposed over said asymmetric dilation layer such that said pair of reactive combiner circuits are coupled to respective ones of said pair of dilation circuit signal paths;

a symmetric feed layer having a plurality of feed circuits symmetrically disposed thereon, said symmetric feed layer disposed over said asymmetric asymmetric reactive combiner layer such that each of said symmetrically disposed plurality of feed circuits are coupled to one of said pair of asymmetric, reactive combiner circuits, wherein said symmetric feed layers is both physically and electrically symmetric; and a symmetric slot layer having a like plurality of slots symmetrically disposed thereon, said symmetric slot layer disposed over said symmetric feed layer such that each of said plurality of feed circuits intersect a respective one of said plurality of slots, wherein said symmetric slot layer is both physically and electrically symmetric.

2. The integrated dilation and feed circuit of claim 1 further comprising:

a pair of substrates, each having first and second opposing surfaces;

a pair of ground planes disposed on corresponding first surfaces of said pair of substrates; and wherein said asymmetric a dilation circuit layer is disposed on a second surface of one substrate opposite the ground plane.

3. The integrated dilation and feed circuit of claim 1 further comprising:

a pair of substrates, each having first and second opposing surfaces;

a pair of ground planes disposed on corresponding first surfaces of said pair of substrates; and wherein said asymmetric reactive combiner layer is disposed on a second surface of one substrate opposite the ground plane.

4. The integrated dilation and feed circuit of claim 1 further comprising:

a pair of substrates, each having first and second opposing surfaces;

a pair of ground planes disposed on corresponding first surfaces of said pair of substrates; and wherein said symmetric feed layer is disposed on a second surface of one substrate opposite the ground plane.

5. The integrated dilation and feed circuit of claim 1 wherein said slot layer is provided as a conductive layer having slots provided therein.

6. The integrated dilation and feed circuit of claim 1 wherein said symmetric slot layer is provided as a conductive layer having slots symmetrically provided therein.

7. The integrated dilation and feed circuit of claim 1 wherein each of said plurality of feed circuits symmetrically cross a respective one of said plurality of symmetric slots.

8. The integrated dilation and feed circuit of claim 2 further comprising a pair of radio frequency (RF) connectors disposed on one of said pair of ground planes with a first one of said pair of RF connectors and coupled to a first end of a first one of said pair of dilation circuit signal paths and a second one of said pair of RF connectors coupled to a first end of a second one of said pair of dilation circuit signal paths.

9. The integrated dilation and feed circuit of claim 1 further comprising:

a first pair of substrates, each having first and second opposing surfaces and a first pair of ground planes disposed on corresponding first surfaces of said first pair of substrates wherein said asymmetric a dilation circuit layer is disposed on a second surface of one substrate of said first pair of substrates opposite the ground plane;

a second pair of substrates disposed over said first pair of substrates, each of said second pair of substrates having first and second opposing surfaces and a second pair of ground planes disposed on corresponding first surfaces of said second pair of substrates, wherein said asymmetric reactive combiner layer is disposed on a second surface of one substrate of said second pair of substrates opposite the ground plane;

a third pair of substrates each having first and second opposing surfaces, said third pair of substrates disposed over said second pair of substrates such that a first surface of a first one of said third pair of substrates is disposed on one of the second pair of ground planes, and wherein said symmetric feed layer is disposed on a second surface of one substrate of said third pair of substrates; and wherein said slot layer is provided as a conductive layer disposed over a surface of the second one of said third pair of substrates.

10. The integrated dilation and feed circuit of claim 1 further comprising a plurality of conductive vias provided in said second pair of substrates and said asymmetric reactive combiner layer, said conductive vias extending between the second pair of ground planes, said plurality of conductive vias disposed between signal paths of said pair of reactive combiner circuits.

11. The integrated dilation and feed circuit of claim 10 further comprising a plurality of conductive vias provided in said dilation layer and disposed throughout said dilation layer to suppress undesired electromagnetic fields in said dilation layer.

12. The integrated dilation and feed circuit of claim 1 wherein each of said plurality of feed circuits symmetrically cross a respective one of said plurality of symmetric slots.

13. A polarization diverse antenna comprising:

an integrated dilation and feed circuit comprising:

an asymmetric a dilation layer comprising a pair of dilation circuit signal paths;

an asymmetric reactive combiner layer comprising a pair of reactive combiner circuits, said asymmetric reactive combiner circuit layer disposed over said asymmetric dilation layer such that said pair of reactive combiner circuits are coupled to respective ones of said pair of dilation circuit signal paths;

a symmetric feed layer having a plurality of feed circuits symmetrically disposed thereon, said symmetric feed layer disposed over said asymmetric asymmetric reactive combiner layer such that each of said symmetrically disposed plurality of feed circuits are coupled to one of said pair of asymmetric, reactive combiner circuits; and a symmetric slot layer having a like plurality of slots symmetrically disposed thereon, said symmetric slot layer disposed over said symmetric feed layer such that each of said plurality of feed circuits intersect a respective one of said plurality of slots; and a radiator assembly comprising at least one radiator, said radiator assembly disposed over said integrated dilation and feed circuit such that the slots in said symmetric slot layer are disposed to coupled RF signals between at least one radiator and said plurality of symmetric feed circuits.

14. The antenna of claim 12 wherein said plurality of feed circuits are disposed on said substrate such that when a first surface of the slot layer is disposed over a first surface of the feed layer, said plurality of feed circuits orthogonally cross respective ones of said plurality of slot apertures such that RF energy may be coupled between the slots in said slot layer and the feed circuits on said feed layer.

15. The antenna of claim 12 wherein said plurality of feed circuits correspond to four feed circuits and said plurality of slots correspond to four diagonal slots and wherein respective ones of said four feed circuits cross respective ones of said four slots.

16. The antenna of claim 12 wherein radiator assembly comprises:

a conductive frame having walls which define a cavity; and a radiator disposed in the cavity.

17. The antenna of claim 13 wherein said radiator is provided as a patch antenna element.

18. The antenna of claim 16 wherein said patch antenna is provided as a symmetrical stacked-patch antenna comprising inner and outer conductors spaced apart by a foam spacer and dielectric substrates.

19. The antenna of claim 18 wherein said combiner, feed and slot layers are disposed relative to said patch antenna element so as to generate a pair of orthogonal electric field vectors with respect to said patch element.

20. The antenna of claim 13 further comprising:

a first plurality of conductive vias provided in the perimeter of each of said asymmetric dilation layer, asymmetric reactive combiner layer, symmetric feed layer and symmetric slot layer so as to form an RF cage in the integrated dilation and feed circuit;

a second plurality of conductive vias provided in said dilation layer and disposed throughout said dilation layer to suppress undesired electromagnetic fields in said dilation layer wherein said second plurality of conductive vias do not penetrate to said combiner circuit layer, said feed circuit layer or said slot layer; and a third plurality of conductive vias provided in said asymmetric reactive combiner layer between signal path regions of said pair of asymmetric reactive combiner circuits.

21. An active electronically scanned array (AESA) comprising:

an egg-crate frame having a plurality of electrically conductive walls which define a plurality of cavities; and a plurality of polarization diverse radiators, each of said polarization diverse radiators disposed within one of the plurality of cavities in said egg-crate frame, each of said plurality of polarization diverse radiators comprising:

an inner antenna element provided from one or more substrates having a conductor disposed thereon with each of the one or more inner antenna element substrates having dimensions such that said antenna element fits inside the cavity;

an outer antenna element provided from one or more substrates having a conductor disposed thereon, said one or more outer antenna element substrates having substantially the same dimensions as the one or more inner antenna element substrates; and a dielectric spacer disposed between the inner and outer antenna elements, said dielectric spacer having substantially the same dimensions as the one or more inner and outer antenna element substrates; and an integrated dilation and feed circuit disposed over and coupled to said plurality of polarization diverse radiators, said integrated dilation and feed circuit comprising:

an asymmetric a dilation layer comprising a pair of dilation circuit signal paths;

an asymmetric reactive combiner layer comprising a pair of reactive combiner circuits, said asymmetric reactive combiner circuit layer disposed over said asymmetric dilation layer such that said pair of reactive combiner circuits are coupled to respective ones of said pair of dilation circuit signal paths;

a symmetric feed layer having a plurality of feed circuits symmetrically disposed thereon, said symmetric feed layer disposed over said asymmetric asymmetric reactive combiner layer such that each of said symmetrically disposed plurality of feed circuits are coupled to one of said pair of asymmetric, reactive combiner circuits; and a symmetric slot layer having a like plurality of slots symmetrically disposed thereon, said symmetric slot layer disposed over said symmetric feed layer such that each of said plurality of feed circuits intersect a respective one of said plurality of slots such that the slots in said symmetric slot layer are disposed to coupled RF signals between plurality of polarization diverse radiators and said symmetric feed layer.

22. The active electronically scanned array (AESA) of claim 21 wherein each of the inner antenna elements and the outer antenna elements are disposed to provide symmetrical stacked patch antenna elements with each of said stacked patch antenna elements symmetrically disposed within a respective one of the plurality of cavities.

23. The active electronically scanned array (AESA) of claim 22 wherein the slots in the symmetric slot layer correspond to slotted aperture couplers, with each of the slotted aperture couplers having an orientation that provides full power transfer for orthogonal circular polarizations and horizontal and vertical polarizations.

24. The active electronically scanned array (AESA) of claim 23 wherein the slotted aperture couplers are provided having a 45 degree orientation such that the slotted aperture couplers provide full power transfer for electric fields having at least one of: orthogonal circular polarizations; a horizontal polarization; and a vertical polarization.

* * * * *